United States Patent
Gizaw et al.

(10) Patent No.: US 7,701,095 B2
(45) Date of Patent: Apr. 20, 2010

(54) PERMANENT-MAGNET GENERATOR AND METHOD OF COOLING

(75) Inventors: Daniel Gizaw, Belleville, MI (US); David M. Erdman, Fort Wayne, IN (US); Joseph E. Miller, Fort Wayne, IN (US); Girma Desta, Suwanee, GA (US)

(73) Assignee: Danotek Motion Technologies, Ann Arbor, MI (US)

( * ) Notice: Subject to any disclaimer, the term of this patent is extended or adjusted under 35 U.S.C. 154(b) by 310 days.

(21) Appl. No.: 11/881,856

(22) Filed: Jul. 30, 2007

(65) Prior Publication Data

US 2008/0030085 A1    Feb. 7, 2008

Related U.S. Application Data

(60) Provisional application No. 60/834,262, filed on Jul. 28, 2006.

(51) Int. Cl.
    *H02K 9/00*    (2006.01)
(52) U.S. Cl. ............................. 310/54; 310/52
(58) Field of Classification Search ................ 310/52, 310/54, 57–59, 89
    See application file for complete search history.

(56) References Cited

U.S. PATENT DOCUMENTS

| | | | |
|---|---|---|---|
| 3,513,942 A | 5/1970 | Sato Tetsuya | |
| 3,911,300 A | 10/1975 | Lebkuchner | |
| 3,955,112 A | 5/1976 | Sell | |
| 5,019,737 A * | 5/1991 | Bruno | 310/89 |
| 5,113,103 A * | 5/1992 | Blum et al. | 310/89 |
| 5,490,319 A | 2/1996 | Nakamura et al. | |
| 5,532,532 A | 7/1996 | DeVault et al. | |
| 5,923,108 A * | 7/1999 | Matake et al. | 310/89 |
| 6,175,173 B1 | 1/2001 | Stephan et al. | |
| 6,198,183 B1 * | 3/2001 | Baeumel et al. | 310/52 |
| 6,229,240 B1 | 5/2001 | Kech et al. | |
| 6,300,693 B1 * | 10/2001 | Poag et al. | 310/54 |
| 6,365,998 B1 | 4/2002 | Kech et al. | |
| 6,433,448 B1 | 8/2002 | Hatton | |
| 6,727,611 B2 * | 4/2004 | Bostwick | 310/58 |
| 6,759,774 B1 * | 7/2004 | Griggs | 310/87 |
| 7,109,626 B2 * | 9/2006 | McClelland et al. | 310/216.121 |
| 7,196,438 B2 * | 3/2007 | Williams et al. | 310/51 |

FOREIGN PATENT DOCUMENTS

| | | |
|---|---|---|
| DE | 19824345 A1 | 12/1999 |
| EP | 0993097 A2 | 4/2000 |
| JP | 03237292 | 10/1991 |

* cited by examiner

*Primary Examiner*—Thanh Lam
(74) *Attorney, Agent, or Firm*—Butzel Long

(57) ABSTRACT

The invention is a generator and cooling mechanism. The generator includes a rotor comprising a shaft with a skewed alignment of magnets on a ring, a stator of toothed laminations with coils wound around the teeth, and a housing with cooling chambers. The housing has annular subchambers arranged successively along the length of the generator in such a way that cooling fluid must flow to the opposite side of the generator to pass into the next chamber. Because the housing is highly heat conductive, this structure of annular subchambers increases the uniformity of the fluid temperature.

10 Claims, 2 Drawing Sheets

PERMANENT-MAGNET GENERATOR AND METHOD OF COOLING

RELATED APPLICATION

The present application is based upon U.S. Provisional Patent Application Ser. No. 60/834,262, filed Jul. 28, 2006 to which priority is claimed under 35 U.S.C. §120 and of which the entire specification is hereby expressly incorporated by reference.

BACKGROUND OF THE INVENTION

A significant problem in generator design is cooling the parts. One difficult aspect of cooling is providing uniform heat dissipation throughout a generator. One previous solution to this problem included wrapping a coil around the generator and running a cooling fluid through the coil. This, however, presented two problems. First, the coils had limited surface area in contact with the body of the generator housing and thermal resistance existed between contacting surfaces of the coil and generator housing, and therefore the coils were not as effective in transferring the heat from the generator to the cooling fluid. Second, the cooling fluid started out at a cooler temperature than when it ended as the cooling fluid traveled around the generator housing. If a cooling fluid travels through the generator, it will provide greater heat transfer near the beginning of its path than near the end because its temperature will increase as it absorbs more heat. Therefore, providing a generator with a cooling flow path of near uniform temperature represents a useful improvement.

SUMMARY OF THE INVENTION

The invention is a generator and cooling mechanism. The generator includes a rotor comprising a shaft with a skewed alignment of magnets on a ring, a stator of toothed laminations with coils wound around the teeth, and a housing with cooling chambers. The housing has annular subchambers arranged successively along the length of the generator in such a way that cooling fluid must flow peripherally to the opposite radial location of the generator to pass into the next chamber. Because the housing is highly heat conductive, this structure of annular subchambers increases the uniformity of the fluid temperature.

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
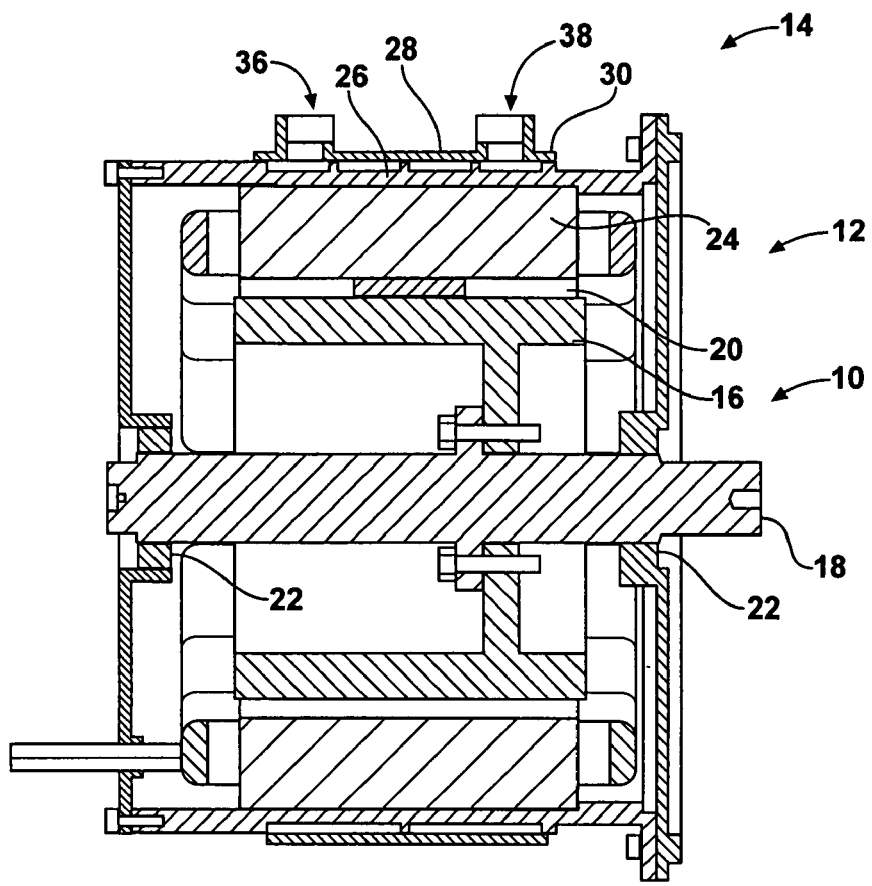
FIG. 1 illustrates a cross-sectional view of the generator in accordance with the present invention.
Figure 2:
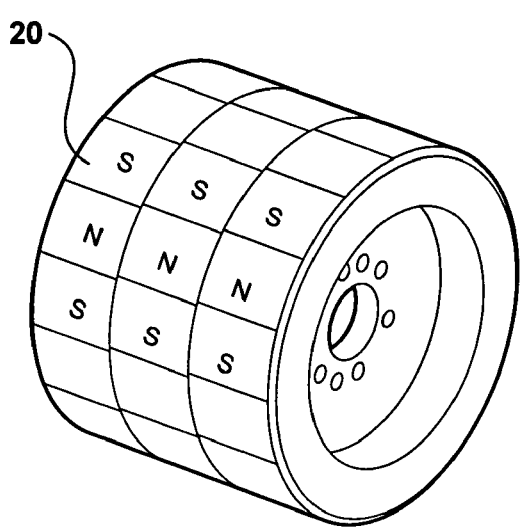
FIG. 2 illustrates the rotor assembly in accordance with the present invention.
Figure 3:
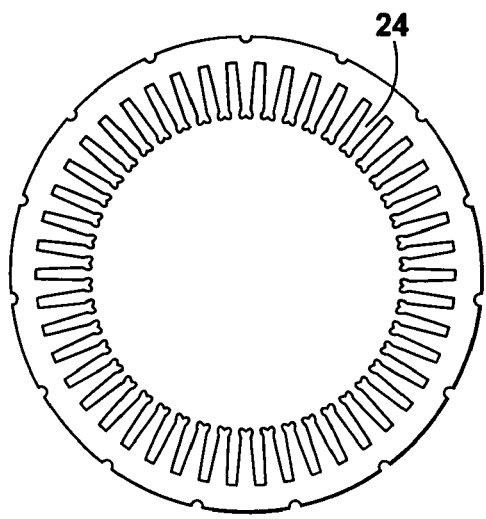
FIG. 3 illustrates the lamination shape in accordance with the present invention.

The generator (FIG. 1) comprises a rotor assembly 10, a stator assembly 12, and a housing assembly 14. The rotor assembly 10 is a ring 16 rigidly affixed to a shaft 13, and the ring 16 has multiple layers of magnets 20 along the ring's length. The ring 16 has a broad face but only a bridge of material rigidly connecting it to the shaft 18 to achieve minimal inertia. Each layer has magnets 20 of alternating polarity around the circumference (FIG. 2). Each layer of magnets 20 is shifted slightly relative to the adjacent layer. The shaft 18 is connected to bearings 22 that rotatably connect the shaft 18 to the housing assembly 14. The stator assembly 12 is a stack of many layers of magnetically conductive laminations 24. Each lamination 24 has the same shape (FIG. 3) and lines up with all of the others. Each lamination 24 has teeth with shoes that have one or more notches in them. The teeth of the lamination stack have conductive wire wrapped around them. The stator assembly 12 is rigidly connected to the inside of the housing assembly 14.

The magnets and teeth on the laminations are more fully described in co-pending patent applications arising out of U.S. patent application Ser. Nos. 11/779,811 and 11/779,825 entitled Compact Integrated Brushless Permanent-Magnet Motor and Drive and Slow-Speed Direct-Drive Generator, respectively. The description of the laminations, magnets, and teeth from those applications is hereby fully incorporated herein.

Figure 4:
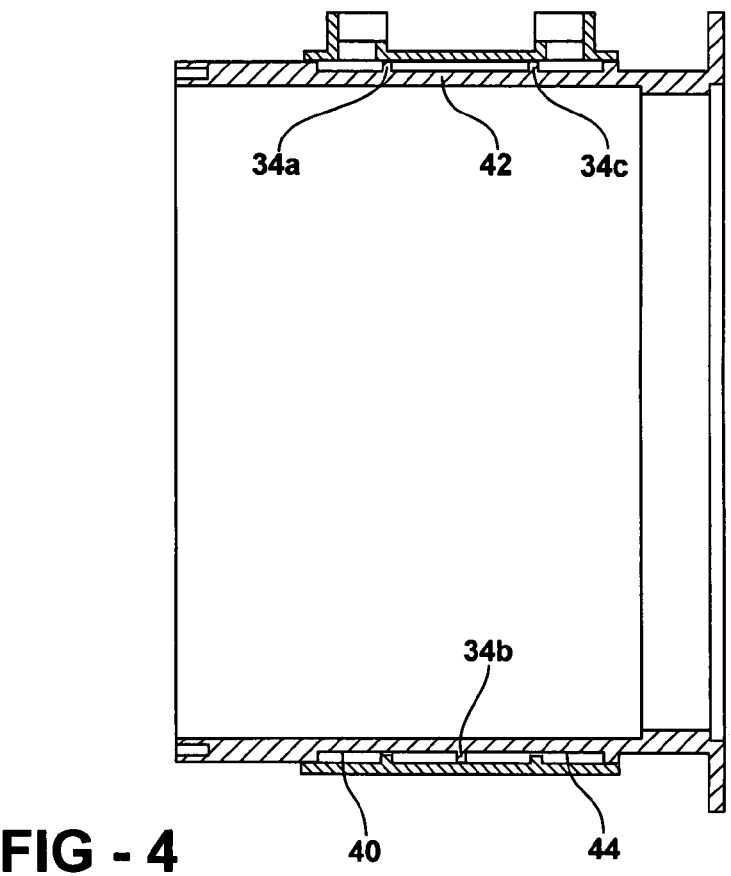
FIG. 4 illustrates a cross-sectional view of a housing in accordance with the present invention.

The housing assembly 14 has an inner layer 26 and an outer layer 28 with a sealed chamber 30 between them (FIG. 4). The housing assembly 14 may be made from a single piece or may be made from 2 or more pieces. In housing assemblies 14 made from a single piece, the piece may be cast, molded, or otherwise made in a single piece using manufacturing methods known in the art. In housing assemblies 14 made from two or more pieces, the multiple pieces may be welded, pressed, glued, or otherwise connected using manufacturing methods known in the art. The chamber 30 is divided into four successive annular subchambers 32a-32d by three internal walls 34a-34c. It is understood that there may be more or less than four annular subchambers and that the subchambers may be designed in a variety of shapes and sizes. It is also understood that the subchambers may be connected by internal walls of various sizes, shapes and configurations. The outer layer 28 has two ports 36, 38 that access the sealed chamber 30; one for the first annular subchamber 32a and one for the fourth 32d. It is understood that there may be more than two ports and that the ports may be in various configurations such as a series or parallel arrangement. The first wall 34a divides the first 32a and second subchambers 32b and has an internal port 40 on the opposite side of the generator as the inlet port 36. The second wall 34b divides the second 32b and third subchambers 32c and has an internal port 42 on the same side of the generator and the inlet and outlet ports 36, 38. The third wall 34c divides the third 32c and fourth 32d subchambers and has an internal port 44 on the opposite side of the generator and the outlet port 38.

Figure 5:
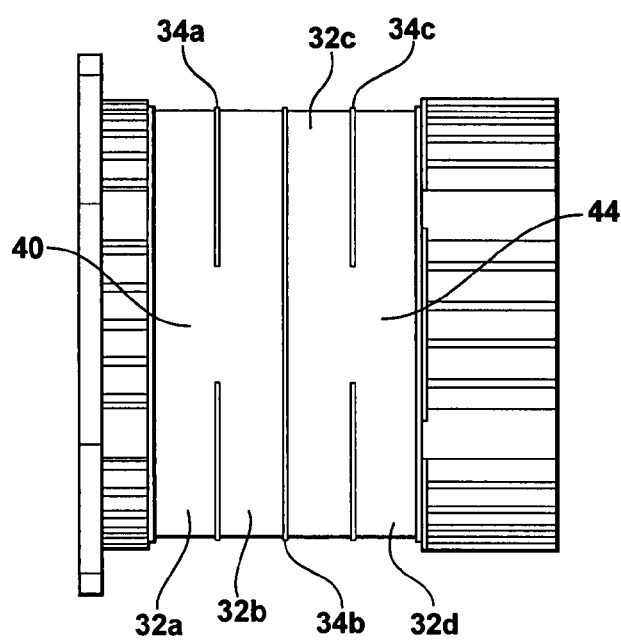
FIG. 5 illustrates a bottom view of a housing in accordance with the present invention.

FIG. 5 shows a bottom view of the four successive annular subchambers 32a-32d. This view also shows the internal walls between the first and second subchambers, 34a, between the second and third subchambers, 34b, and between the third and fourth subchambers, 34c. From the view shown in FIG. 5 the ports between the first and second subchambers, 40 and between the third and fourth subchambers, 44, can be seen.

In operation, cooling fluid, such as water or glycol, enters into the housing chamber 30 through the inlet port 36 and exits through the outlet port 38. Cooling liquid enters into the first subchamber 32a through the inlet port 36 and flows in a peripheral direction and enters into the second chamber 32b through the first internal port 40. This process is repeated in the successive chambers until the liquid reaches the exit port 38. Internal heat generated in the stator is conducted to the aluminum housing and then dissipated to the cooling liquid. The temperature rise in the liquid is low enough that almost a uniform temperature liquid is in contact with the highly conductive aluminum housing, which helps to maintain a uniform temperature distribution in the housing.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A permanent-magnet generator comprising:
   a rotor and a stator disposed about the rotor; and
   a housing having an inner wall and an outer wall and an integral cooling chamber formed therebetween, wherein the housing chamber includes at least two subchambers separated by a circumferentially extending internal wall, and an internal port provides fluid access between the subchambers such that the fluid flows.

2. The permanent-magnet generator of claim 1 further comprising an inlet port in the housing for directing fluid into the housing chamber.

3. The permanent-magnet generator of claim 2 further comprising an outlet port in the housing for directing fluid out of the housing chamber.

4. The permanent-magnet generator of claim 1 wherein the internal ports are positioned at alternating ends of the perimeter of the housing between successive subchambers to maintain a uniform distribution of temperature throughout the housing.

5. The permanent-magnet generator of claim 1 further comprising four subchambers.

6. The permanent-magnet generator of claim 1 wherein the internal ports are positioned at alternating ends of the perimeter of the housing between successive subchambers.

7. A method for uniformly cooling a permanent-magnet generator, said method comprising the steps of:
   positioning a rotor and a stator within a housing, wherein the housing includes an inner wall and an outer wall and an integrally formed cooling chamber disposed therebetween;
   dividing the cooling chamber into at least two cooling subchambers using a circumferentially extending internal wall, wherein the cooling chambers are in fluid communication via an internal port;
   directing fluid through each of said cooling chambers in a peripheral direction to uniformly cool said stator and rotor.

8. The method of claim 7 wherein the cooling chambers directs fluid in alternating directions around the periphery of the stator assembly.

9. A permanent-magnet generator comprising:
   a rotor and a stator disposed about the rotor; and
   a housing having an inner wall and an outer wall and an integral cooling chamber disposed therebetween;
   wherein the housing chamber includes a plurality of subchambers separated by a circumferentially extending internal wall and having a plurality of internal ports each providing fluid access between the subchambers, wherein the internal ports are positioned at alternating ends of the perimeter of the housing between successive subchambers to maintain a uniform distribution of temperature throughout the housing.

10. The permanent-magnet generator of claim 9 further comprising an inlet port in the housing for directing fluid into the housing chamber and an outlet port in the housing for directing fluid out of the housing chamber.

* * * * *